United States Patent
Grunwald et al.

(10) Patent No.: US 11,104,321 B2
(45) Date of Patent: Aug. 31, 2021

(54) METHOD FOR PUTTING INTO OPERATION A BRAKE SYSTEM WITH PREDEFINED APPROVAL SPECIFICATIONS AND SYSTEM FOR PUTTING INTO OPERATION A BRAKE SYSTEM WITH PREDEFINED APPROVAL SPECIFICATIONS

(71) Applicant: KNORR-BREMSE SYSTEME FÜR SCHIENENFAHRZEUGE GMBH, Munich (DE)

(72) Inventors: Torsten Grunwald, Seehausen am Staffelsee (DE); Stefan Aurich, Friedberg (DE); Stefan Schneider, Munich (DE); Frank Günther, Munich (DE); Matthias Kropp, Munich (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 435 days.

(21) Appl. No.: 15/751,069

(22) PCT Filed: Aug. 2, 2016

(86) PCT No.: PCT/EP2016/068415
§ 371 (c)(1),
(2) Date: Feb. 7, 2018

(87) PCT Pub. No.: WO2017/025384
PCT Pub. Date: Feb. 16, 2017

(65) Prior Publication Data
US 2018/0236992 A1 Aug. 23, 2018

(30) Foreign Application Priority Data

Aug. 7, 2015 (DE) ..................... 10 2015 113 078.5

(51) Int. Cl.
*B60T 17/22* (2006.01)
*G01M 17/08* (2006.01)
(Continued)

(52) U.S. Cl.
CPC ............ *B60T 17/228* (2013.01); *B60T 8/172* (2013.01); *B60T 8/1705* (2013.01);
(Continued)

(58) Field of Classification Search
CPC .. G01M 17/08; B61L 27/0055; B60T 8/1705; B60T 2210/12; B60T 2270/86;
(Continued)

(56) References Cited

U.S. PATENT DOCUMENTS

| 5,943,962 A | 8/1999 | Birkhahn et al. |
| 2004/0163451 A1 | 8/2004 | Kim et al. |

(Continued)

FOREIGN PATENT DOCUMENTS

| CN | 101032958 A | 9/2007 |
| CN | 101916304 A | 12/2010 |

(Continued)

OTHER PUBLICATIONS

Search Report and Written Opinion for International Patent Application No. PCT/EP2016/068415 dated Oct. 28, 2016.
(Continued)

*Primary Examiner* — Dale Moyer
(74) *Attorney, Agent, or Firm* — Barnes & Thornburg LLP

(57) ABSTRACT

The invention relates to a method and to a system for putting into service a brake system having specified approval prerequisites, in particular wherein the brake system is a pneumatic and/or hydraulic braking system, in particular a pneumatic and/or hydraulic braking system of a rail vehicle, wherein the control data set for the brake system is set on the
(Continued)

basis of a real reference operation and a virtual test operation in such a way that the specified approval prerequisites are achieved.

18 Claims, 2 Drawing Sheets

(51) Int. Cl.
*B60T 13/66* (2006.01)
*B60T 8/17* (2006.01)
*B60T 8/172* (2006.01)
*B60T 8/176* (2006.01)
*B60T 8/18* (2006.01)
*B60T 8/58* (2006.01)

(52) U.S. Cl.
CPC .......... *B60T 13/665* (2013.01); *B60T 17/221* (2013.01); *G01M 17/08* (2013.01); *B60T 8/176* (2013.01); *B60T 8/1893* (2013.01); *B60T 8/58* (2013.01); *B60T 2210/12* (2013.01); *B60T 2270/413* (2013.01)

(58) Field of Classification Search
CPC .... B60T 17/228; B60T 8/3235; B60T 13/665; B60T 8/172; B60T 17/221; B60T 8/176; B61H 13/00
See application file for complete search history.

(56) References Cited

U.S. PATENT DOCUMENTS

| | | | |
|---|---|---|---|
| 2014/0343767 A1* | 11/2014 | Oswald | B60T 17/228 701/19 |
| 2015/0215392 A1 | 7/2015 | Miebs | |
| 2015/0294049 A1* | 10/2015 | Kang | G06F 30/20 703/2 |
| 2017/0066460 A1* | 3/2017 | Zhou | B61L 27/0094 |
| 2017/0361856 A1* | 12/2017 | Fischer | B61L 27/0088 |

FOREIGN PATENT DOCUMENTS

| | | |
|---|---|---|
| CN | 103309241 A | 9/2013 |
| CN | 103747997 A | 4/2014 |
| CN | 103781676 A | 5/2014 |
| CN | 104349959 A | 2/2015 |
| CN | 104374586 A | 2/2015 |
| CN | 104620540 A | 5/2015 |
| DE | 102011113024 A1 | 3/2013 |
| EP | 2753514 A2 | 7/2014 |
| WO | 9631385 A1 | 10/1996 |
| WO | 2014029581 A1 | 2/2014 |

OTHER PUBLICATIONS

Maksym Spiryagin et al.; (2013) Hardware-in-the-loop simulations for railway research, Vehicle System Dynamics; Taylor & Francis Group; Jan. 2013; 2 pages.

Lionel Belmon et al.; High-speed train pneumatic braking system with wheel-slide protection device; Modelica Conference; Germany; Mar. 20-22, 2011; 8 pages.

Ho-Yeon Kim et al.; Hardware-in-the Loop Simulation for a Wheel Slide Protection System of a Railway Train; IFAC; Aug. 24-29, 2014; 6 pages.

Florian Sumpf; TrainBraC—Bremsberechnungsprogramm fur Auslegung and Nachweisfuhrung; Jun. 2010; 6 pages and English Machine Translation 12 pages.

* cited by examiner even before an approval run has to be avoided. Through the virtual test run it is possible to carry out a precise prediction of the behavior of the brake system under the real conditions of the dynamic putting into operation.

METHOD FOR PUTTING INTO OPERATION A BRAKE SYSTEM WITH PREDEFINED APPROVAL SPECIFICATIONS AND SYSTEM FOR PUTTING INTO OPERATION A BRAKE SYSTEM WITH PREDEFINED APPROVAL SPECIFICATIONS

PRIORITY CLAIM

This patent application is a U.S. National Phase of International Patent Application No. PCT/EP2016/068415, filed Aug. 2, 2016, which claims priority to German Patent Application No. 10 2015 113 078.5, filed Aug. 7, 2015, the disclosures of which are incorporated herein by reference in their entirety.

FIELD

The present invention relates to a method and to a system for putting into operation a brake system with predefined approval specifications, wherein the brake system has at least partially a friction brake, and wherein the brake system also has a controller with an initial control data set for actuating the brake system during operation.

BACKGROUND

In order to put into operation a brake system, in particular a pneumatic and/or hydraulic brake system with an at least partial friction brake, at present, and according to the prior art, the rail vehicle is tested under real conditions on a test track when it is put into operation dynamically (IBS).

These test runs are carried out in such a way that during a reference run the initial values for the control data (initial control data set) of the brake system are tested and in the process it is checked whether the brake system of the rail vehicle satisfies the predefined approval specifications. If the approval specifications are not achieved, test runs are carried out iteratively until a control data set for the brake system which permits the approval specifications to be complied with is found.

WO 2014/029581 A1 has already disclosed a method for putting into operation at least one device for displaying status information or diagnostic information of the vehicle combination in a first rail vehicle of a vehicle combination composed of one or more rail vehicles, wherein the device can be operated based on at least one set of function data. However, WO 2014/029581 A1 does not deal with the putting into operation of a pneumatic system.

WO 1996/031385 A1 discloses an apparatus for compensating the transverse forces acting on a rail vehicle, the car body of which rail vehicle is supported on at least one bogie via a suspension system and which can be displaced in the transverse direction with respect to the bogie by means of a transverse compensator. In this context, a transverse suspension system is assigned for buffering dynamic oscillations, which system can be optionally switched on or off as a function of the driving state. In this context, a simulation model is also disclosed with which the vehicle movement dynamics of a bogie which is provided with the transverses compensation apparatus according to the invention can be simulated.

SUMMARY

The current dynamic method of putting into operation a rail vehicle usually requires a multiplicity of test runs, which entails enormous expenditure in terms of personnel, material and also costs for the use of the test track.

Thus, disclosed embodiments improve a method and a system for putting a brake system into operation with predefined approval specifications, in particular to the effect that the number of test runs can be significantly reduced.

BRIEF DESCRIPTION OF THE FIGURES

Further details and advantages of the invention will now be explained in more detail with reference to an exemplary embodiment which is illustrated in the drawings.

In the drawings.

DETAILED DESCRIPTION

Figure 1:
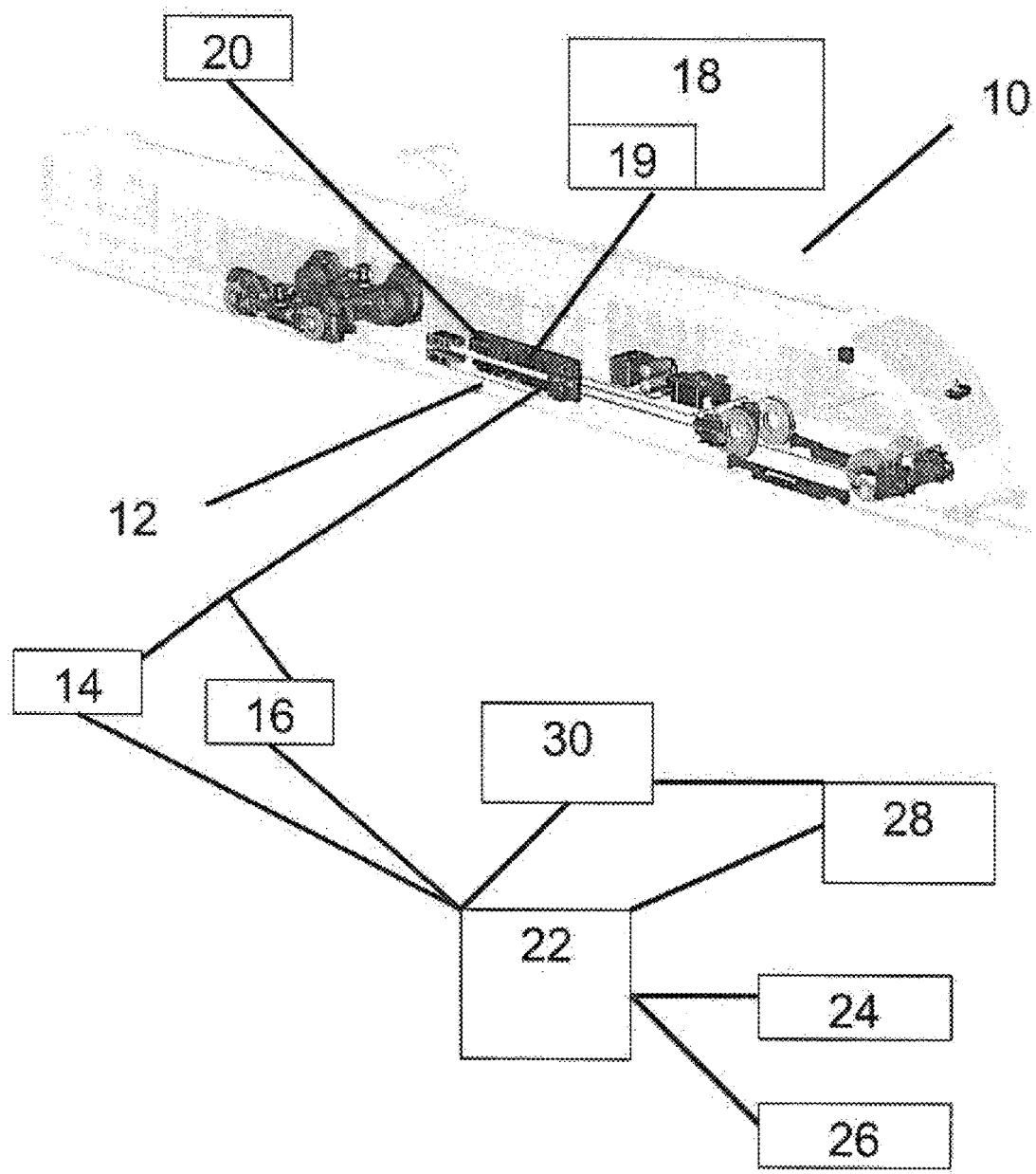
FIG. 1 shows a schematic illustration of an exemplary embodiment of the system according to the invention with which the method according to the invention can be carried out.

Disclosed embodiments provide a method for putting into operation a brake system with predefined approval specifications, wherein the brake system has at least partially a friction brake, wherein in addition the brake system has a controller with an initial control data set for actuating the brake system during operation, includes at least the following steps: a reference operation is carried out and at least one type of real reference operating parameters of the brake system is detected; based on the reference operating parameters a virtual mode of the brake system is produced with an initial virtual control data set which corresponds to the initial control data set; based on the model, at least one virtual test operation is carried out in order to check the compliance with the predefined approval specifications; based on the virtual test operation, the virtual control data set is checked to determine to what extent this has to be changed so that the predefined approval specifications are achieved by the brake system and at least one correction factor is determined in order to obtain a corrected virtual control data set.

Disclosed embodiments are based on the basic concept that a part of the test operation is no longer executed within the scope of real test runs but rather preferably for the most part in a virtual fashion. For this purpose at least one type of reference parameters which describe or characterize the pneumatic system is determined based on a real reference operation. This data is then used as a basis to create a model of the brake system which is as informative as possible. This model is in turn used for a simulation by means of which a virtual test operation is carried out. Based on this test operation, further information is acquired about the extent to which the initially selected control data of the pneumatic system, also referred to as initial control data set, permits the predefined approval specifications to be achieved and about the extent to which the control data has to be modified in order to attain the predefined approval specifications.

As a result it becomes possible to avoid costly trials and test days on a test track, and overall to reduce the number of tests which have to be carried out in real terms. Under certain circumstances it is even possible to dispense with the real test check. Consequently, in the real test operation iteration loops which are caused by a system test, a re-setting of the technical parameters of the system and a new system test etc. are avoided. Overall, the process of putting the vehicle into operation can therefore be significantly simplified.

The term control data set includes data which is selected for performing open-loop and/or closed-loop control of the brake system. The term reference operation can include a static and/or dynamic operation of a brake system, a test run or else a plurality of test runs. The term parameter or reference operating parameter is to be understood, in particular, as meaning that a parameter describes or characterizes a relevant variable which describes or is characteristic of e.g. the brake system or parts of the brake system or the behavior of the brake system.

Based on the corrected operating parameter, at least one checking operation can be carried out in order to check the attainment of the predefined approval specifications in reality. If the predefined approval specifications of the pneumatic system are achieved at the initial or the modified control data in the virtual test operation, they are advantageously verified once more in a real test operation (real test check).

In addition, an initial and/or initial virtual and/or corrected virtual control data set can include at least one value which is connected in relation to a braking force and/or a braking force distribution and/or a control device algorithm of the brake system.

It is conceivable, for example, for a control data set to have a value or setpoint value for the braking force and/or braking force distribution (e.g. in each case as a function of a specific operating state or a driving state) or a parameter which defines the braking force and/or braking force distribution.

Furthermore, in at lease one implementation, based on the corrected operating parameters, the initial control data set is modified in such a way that the control data of the brake system satisfies the approval specifications. This ensures that the control data set for the brake system is input into the brake system e.g. automatically or semi-automatically (e.g. after a pervious check by the testing personnel) into the brake based on the virtual test operation, and as a result the predefined approval specifications are achieved.

The checking process of the operating parameters can include a consideration of the difference between the virtual test operation and the reference operation based on the virtual test operation. As a result, the informative force of the virtual test operation can be made larger and more stable.

In particular, in at lease one implementation, the consideration of differences is a consideration of differences between the virtual test operation and the reference operation in comparison with the predefined approval specifications. As a result, a solution to the optimization problem can be found more quickly, e.g., by interpolation even during the virtual test operation.

The virtual test operation can include checking whether the virtual model with the initial virtual control data set or with the virtual control data set modified during the test operation satisfies the predefined approval specifications. This can ultimately make it possible to cause a final test operation to become superfluous in reality, since the data which is obtained in a virtual fashion is already informative enough. When the predefined approval specifications are satisfied, the virtual test operation ends.

In addition in at lease one implementation, a virtual control data set which satisfies the predefined approval specifications is transmitted as a corrected control data set to the brake system. As a result, the brake system is easily set to the predefined approval data. This permits prompt implementation of the virtual results in the real system.

The transmission of the corrected control data set can take place automatically or semi-automatically. Optionally, the transmission of the corrected control data set is possible partially or completely manually, e.g., by means of an adjustment screw or the like (e.g. manual actuating slide or manual actuating wheel). Optionally, a digital interface may be provided for the transmission of the corrected control data set. The digital interface can be a wire-bound and/or wireless interface.

Furthermore, in at lease one implementation, the brake system may be a pneumatic and/or hydraulic brake installation, in particular a pneumatic and/or hydraulic brake installation of a rail vehicle.

In at lease one implementation, a reference operating parameter may be a parameter which describes indirectly or directly air consumption, braking distance, response behavior, anti-skid protection, response time, brake, filling times, coefficients of friction, vehicle weight, braking force, maximum speed, braking force distribution, response behavior on a component basis, control device algorithms, container sizes, pipeline diameters, pipeline lengths and/or drop in pressure in lines, friction losses, energy consumption, relative speeds and/or slip of the brake system.

It is to be noted that values which are connected in relation to a braking force and/or braking force distribution and/or a control device algorithm of the brake system can be both reference-operating parameters because they describe the brake system and part of a control data set because they can be correspondingly set or are data which is selected to perform open-loop and/or closed-loop control of the brake system.

The method can be carried out, in particular, in relation to a dynamic process of putting into operation (IBS) a rail vehicle within the scope of a vehicle approval process of a rail vehicle. Until now, a test track has been hired for a vehicle approval process and the vehicle parameters have been partially determined overnight in road tests by means of technicians working on the vehicle. Within the road test parameters may be acquired, such as for example: air consumption, braking distance, response behavior of anti-skid protection, response time of brake, and filling times.

The virtual model (simulation model) is based on the functional vehicle model with the technical parameters assigned to this model.

These technical parameters for describing the brake system include, but not exclusively:
coefficients of friction such as e.g. brake lining/brake disk, wheel/rail, vehicle weight, braking force, maximum speed, braking force distribution, response behavior on a component basis, control device algorithms.

Further parameters can optionally be determined. These include, for example, but not exclusively: vontainer sizes (of the brake system), pipeline diameters (of the brake system), pipeline lengths (of the brake system), drop in pressure in lines (of the brake system), and friction losses.

After the simulation model has been completed, the system behavior of the vehicle is simulated.

Parameters which are determined during the simulation of the system behavior of the vehicle are, inter alia, but not exclusively braking distance, air consumption, and filling times.

In addition, further parameters, listed by way of example below, can be determined: response behavior of anti-skid protection, response time of brake, energy consumption values, and relative speed/slip.

Furthermore, the present invention relates to a system for putting into operation a brake system with predefined approval specifications. This system includes at least the following features: a brake system having at least one control unit, wherein the control unit has at least one data input interface and at least one data output interface as well as at least control data set memory; at least one sensor for detecting a type of real reference operating parameters of the brake system in a reference operation; at least one simulation unit for generating a virtual model of the brake system with an initial virtual control data set which corresponds to the initial control data set, based on the reference operation parameters; at least one checking unit by means of which at least one virtual test operation can be carried out based on the model in order to check the attainment of the predefined approval specifications, and wherein based on the virtual test operation, the virtual control data set can be checked by means of the checking unit to determine to what extent this has to be changed for the break system to attain the predefined approval specifications, and wherein by means of the checking unit at least one correction factor can be determined in order to obtain a corrected virtual control data set.

Furthermore, at least one correction unit can be provided in order to transmit the corrected virtual control data set to the control unit of the brake system, in order to carry out at least one checking operation based on the corrected operating parameter, in order to check the attainment of the predefined approval specifications in reality.

The system can implement, alone or in combination, all of the structural and functional features disclosed in relation to the method described above, and achieve the corresponding advantages. This also applies conversely, i.e. structural and functional features which are described in relation to the system can also be used in the method.

Furthermore, in at lease one implementation, the brake system is a pneumatic and/or hydraulic brake installation, in particular a pneumatic and/or hydraulic brake installation of a rail vehicle.

The method for putting into operation a brake system with predefined approval specifications can be carried out by means of the system.

The simulation unit can be arranged in the vehicle itself.

However, the simulation unit may be optionally arranged remotely from the brake system itself or remotely from the vehicle. In this context it is, in particular, conceivable for the simulation unit to be connected to the control unit of the brake system via a wireless interface.

FIG. 1 shows a schematic illustration of an exemplary embodiment of the system according to the invention for putting into operation a brake system 10 with predefined approval specifications, with which system the method according to the invention for putting a brake system 10 into operation can be carried out.

In the exemplary embodiment described here, the brake system 10 is a pneumatic brake installation of a rail vehicle and partially has a friction brake.

The brake system 10 has a control unit 12, wherein the control unit 12 has at least one data input interface 14 and at least one data output interface 16 as well as at least control data set memories 18 for control data sets. An initial control data set 19 is initially stored in the control data set memory 18.

In addition, sensors 20 for detecting reference operating parameters of the brake system 10, e.g., in a reference operation, are provided.

The sensors 20 are suitable sensors for detecting operating parameters such as coefficients of friction such as e.g. brake lining/brake disk, wheel/rail, vehicle weight, braking force, maximum speed, and braking force distribution.

In addition, a simulation unit 22 for generating a virtual model 24 of the brake system 10 with an initial virtual control data set 26 which corresponds to the initial control data set (and, e.g., has been read out via the data output interface 16), based on the reference operation parameters.

In addition, a checking unit 28 is provided by means of which at least one virtual test operation can be carried out based on the model 24 in order to check the attainment of the predefined approval specifications, and wherein based on the virtual test operation the virtual control data set can be checked by means of the checking unit 28 to determine to what extent this has to be changed, so that the predefined approval specifications are attained by the brake system 10.

By means of the checking unit 28 it is also possible to determine at least one correction factor in order to obtain a corrected virtual control data set.

Furthermore, a correction unit 30 is provided in order to transmit the corrected virtual control data set to the control unit 12 of the brake system 10 via the data input interface 14, in order to carry out at least one checking operation based on the corrected operating parameter, in order to check the attainment of the predefined approval specifications in reality.

The corrected control data set is stored or correspondingly set in the control data set memory 18 by means of the correction unit 30. This can take place in an analog and/or digital fashion. In this context it is conceivable that, for example, a mechanical and/or a digital and/or electronic setting possibility is provided.

For example, an input variable into the control unit 12, which is set by means of the correction unit 30, can be the pressure in the main line of the brake system e.g. of a rail vehicle. The output variable can in this case be the brake pressure. An adjustment screw and/or a digital interface can be provided as the data input interface 14 for inputting the corrected control data set, which data input interface 14 is used in this case to set the brake pressure of the brake system 10.

If the setting process is performed by a digital interface, the transmission of the corrected control data set can be carried out automatically or else semi-automatically.

Figure 2:
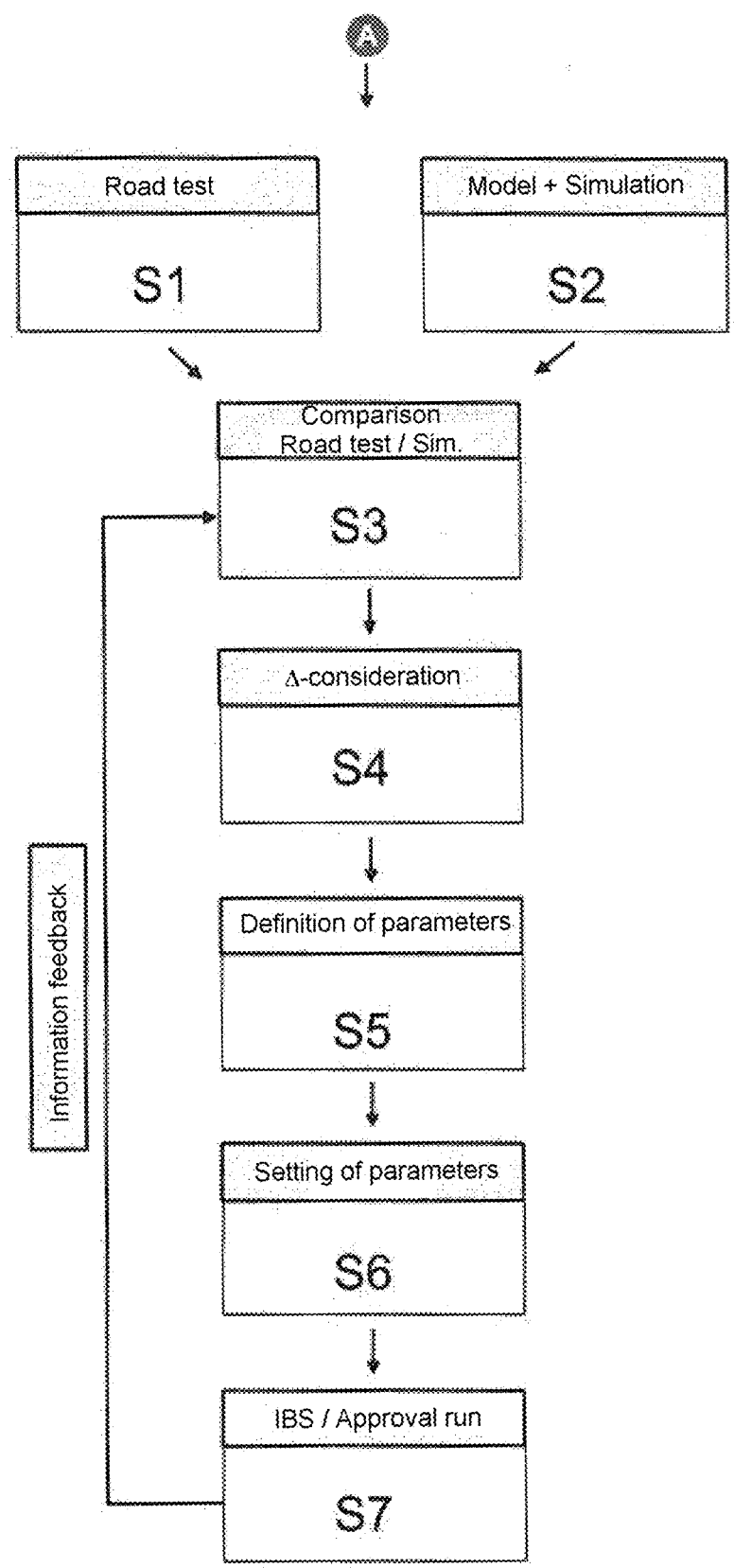
FIG. 2 shows a flowchart of the method according to the invention in a possible embodiment which is implemented based on the system according to FIG. 1.

FIG. 2 shows a schematic illustration of the use of an exemplary embodiment according to the invention of a method and system for putting the brake system 10 into operation in order to reduce vehicle test runs during the process of putting rail vehicles into operation and/or approving them.

The entry point into the method or the exit point A is the commissioning of a dynamic process of putting a vehicle into operation (IBS) within the scope of a vehicle approval process.

Hitherto, for a vehicle approval process a test track was hired and the vehicle parameters were partially determined overnight in road tests by technicians who work on the vehicle.

According to the inventive exemplary embodiment of the method, in a step 1 S1 a road test, specifically what is referred to as a reference operation, is also carried out.

Within the road test, parameters are acquired such as, for example, Braking distance, Air consumption, Response behavior of anti-skid protection, Response time of the brake, and Filling times.

In step 1 S1 a reference operation is also carried out and at least one type of real reference operating parameters of the pneumatic system is detected.

After the entry point in parallel with the road test in step 1 S1 a simulation model of the entire vehicle (total system of the rail vehicle) is then built up (step 2 S2).

The simulation model is based on the functional vehicle model with the technical parameters which are assigned to this model.

These technical parameters include, but not exclusively: coefficients of friction such as e.g. brake lining/brake disk, wheel/rail, vehicle weight, braking force, maximum speed, braking force distribution, response behavior on a component basis, and control device algorithms.

Further parameters can optionally be determined. These include for example but not exclusively: container sizes, pipeline diameters, pipeline lengths, drop in pressure in lines, and friction losses.

Therefore, a virtual model of the brake system with an initial virtual control data set which corresponds to the initial control data set is produced based on the reference operation parameters.

After the completion of the simulation model, the system behavior of the vehicle is simulated.

Parameters which are determined during the simulation of the system behavior of the vehicle are inter alia, but not exclusively: braking distance, air consumption, and filling times.

In addition, further parameters, listed by way of example below, are determined: response behavior of anti-skid protection, response time of brake, energy consumption values, and relative speeds/slip.

Within the simulation, state equations for the system under consideration are produced and solved. In this context, typically non-linear, differential-algebraic equation systems are produced. In a normal case, suitable time integration methods must be used here. Partial systems can also be described and solved by means of state machines.

During the simulation, historical data is also used in connection with empirical values in order to describe the virtual vehicle suitably. The virtual vehicle is adapted by comparing the model with historical test data.

In other words, at least one virtual test operation is carried out based on the model in order to check the attainment of the predefined approval specifications.

After the events of the road test (step 1 S1) and the simulation are available (step 2 S2), they are compared with one another and the technical parameters of the simulation (virtual vehicle) are if necessary adapted/finely adjusted, with the result that the simulation results correspond to the real road test results, and therefore the simulation model (virtual vehicle) corresponds to the real vehicle (step 3 S3).

In the next step 4 S4, the simulation results of the virtual vehicle (or, since they have the same coverage, the results of the road test) are compared with the normative requirements such as, for example, for approval of a vehicle. A setpoint/actual value comparison takes place, which determines whether the virtual vehicle complies with the approval specifications.

In the next step, it is to be noted that the state of the test vehicle and of the simulation model can be intentionally made different from one another, in order to detect, in the simulation, states which cannot be brought about on the real vehicle, or only with a high level of expenditure.

As a result, it is possible both to increase the informative capability of the approval process and also reduce the expenditure on road tests on the real vehicle.

Based on the virtual test operation it is therefore possible to check the virtual control data set to determine to what extent this has to be changed so that the pneumatic system attains the predefined approval specifications, and at least one correction factor is determined in order to obtain a corrected virtual control data set. Based on the corrected operating parameter, at least one checking operation is then carried out in order to check the attainment of the predefined approval specifications in reality.

An initial, a virtual or a corrected virtual control data set can include a value or values which is/are connected in relation to a braking force and/or a braking force distribution and/or a control device algorithm of the brake system.

If the approval requirements are complied with, no further actions take place. In the case of deviations, the technical parameters are adapted on the virtual vehicle until the approval specifications are satisfied. These technical parameters are defined and communicated to the road test technician (step 5 S5).

The determined technical parameters can then be set on the real vehicle by the road test technician (step 6 S6) and an IBS run or approval run can be carried out (step 7 S7). Given suitable preconditions it is possible to dispense with the approval run. The IBS in combination with the simulation of the virtual vehicle is to be used in this case as a basis for the approval.

Through the use of simulation models with technical parameters it is possible to avoid test days on the test track and/or the number of days on a test track can be reduced. Given suitable preconditions, a final IBS or approval run can be eliminated.

Iteration loops which arise as a result of a vehicle test, re-setting of the technical parameters on the real vehicle and a renewed vehicle test are avoided.

The last valid values are fed back to the simulation for the comparison of the last status of a real vehicle/virtual vehicle.

LIST OF REFERENCE SYMBOLS

10 Brake system
12 Control unit
14 Data input interface
16 Data output interface
18 Control data set memory
19 Initial control data set
20 Sensors
22 Simulation unit
24 Virtual model
26 Initial virtual control data set
28 Checking unit
30 Correction unit
A Output point
S1 Step 1
S2 Step 2
S3 Step 3
S4 Step 4
S5 Step 5
S6 Step 6
S7 Step 7

The invention claimed is:

1. A method for operating a brake system with predefined approval specifications, wherein the brake system includes at least a friction brake and a controller with an initial control data set for actuating the brake system, the method comprising:

carrying out a reference operation and detecting at least one type of real reference operating parameter of the brake system;

based on the detected at least one type of real reference operating parameter, producing a virtual model of the brake system with an initial virtual control data set that corresponds to the initial control data set;

based on the virtual model, carrying out at least one virtual test operation in a virtual environment to check compliance with the predefined approval specifications;

based on of the virtual test operation, checking the virtual control data set-to determine to what extent the virtual control data set requires alteration so that the predefined approval specifications are achieved by the brake system, and determining at least one correction factor to obtain a corrected virtual control data set.

2. The method of claim 1, further comprising checking, based on the corrected virtual control data set, at least one checking operation to check actual attainment of the predefined approval specifications.

3. The method of claim 1, wherein an initial and/or initial virtual and/or corrected virtual control data set comprises at least one value, which is connected in relation to a braking force and/or a braking force distribution and/or a control device algorithm of the brake system.

4. The method of claim 1, wherein, based on the corrected virtual control data set, the initial control data set is modified such that the brake system satisfies the approval specifications.

5. The method of claim 1, wherein the checking process comprises a consideration of differences between the virtual test operation and the reference operation based on the virtual test operation.

6. The method of claim 5, wherein the consideration of differences is a consideration of differences between the virtual test operation and the reference operation in comparison with the predefined approval specifications.

7. The method of claim 1, wherein the virtual test operation comprises checking whether the virtual model with the initial virtual control data set or with the virtual control data set modified during the test operation satisfies the predefined approval specifications.

8. The method of claim 7, further comprising a virtual control data set which satisfies the predefined approval specifications as a corrected control data set to a mechanical system.

9. The method of claim 1, wherein the brake system is a pneumatic and/or hydraulic brake installation of a rail vehicle.

10. The method of claim 1, wherein the at least one reference operation parameter is a parameter which indicates indirectly or directly air consumption, braking distance, response behavior, anti-skid protection, response time, brake, filling times, coefficients of friction, vehicle weight, braking force, maximum speed, braking force distribution, response behavior on a component basis, control device algorithms, container sizes, pipeline diameters, pipeline lengths and/or drop in pressure in lines, friction losses, energy consumption, relative speeds and/or slip of the brake system.

11. The system of claim 1, wherein the virtual test operation comprises checking whether the virtual model with the initial virtual control data set or with the virtual control data set modified during the test operation satisfies the predefined approval specifications.

12. The system of claim 11, further comprising a virtual control data set which satisfies the predefined approval specifications as a corrected control data set to a mechanical system.

13. A system for putting into operation a brake system with predefined approval specifications, wherein the brake system has at least partially a friction brake, wherein a method operation of the brake system is performed with predefined approval specifications, wherein the system is configured to:

carry out a reference operation and detecting at least one type of real reference operating parameter of the brake system;

based on the detected at least one type of real reference operating parameter, producing a virtual model of the brake system with an initial virtual control data set that corresponds to the initial control data set;

based on the virtual model, carry out at least one virtual test operation in a virtual environment to check compliance with the predefined approval specifications;

based on the virtual test operation, checking the virtual control data set by comparison of a setpoint value with a simulation result value to determine to what extent the virtual control data set test operation requires alteration so that the predefined approval specifications are achieved by the brake system, and determining at least one correction factor to obtain a corrected virtual control data set.

14. The system of claim 13, wherein an initial and/or initial virtual and/or corrected virtual control data set comprises at least one value, which is connected in relation to a braking force and/or a braking force distribution and/or a control device algorithm of the brake system.

15. The system of claim 13, wherein, based on the corrected virtual control data set, the initial control data set is modified such that the brake system satisfies the approval specifications.

16. The system of claim 13, wherein the checking the virtual control data comprises a consideration of differences between the virtual test operation and the reference operation based on the virtual test operation.

17. The system of claim 16, wherein the consideration of differences is a consideration of differences between the virtual test operation and the reference operation in comparison with the predefined approval specifications.

18. The system of claim 13, wherein the brake system is a pneumatic and/or hydraulic brake installation of a rail vehicle.

* * * * *